United States Patent
Lacy et al.

[11] 3,924,226
[45] Dec. 2, 1975

[54] DISPLAY DEVICE HAVING AN ARRAY OF MOVABLE DISPLAY ELEMENTS

[75] Inventors: Robert H. Lacy; James E. Russell, both of Dallas, Tex.

[73] Assignee: F&M Systems Co., Dallas, Tex.

[22] Filed: May 28, 1974

[21] Appl. No.: 473,559

[52] U.S. Cl...... 340/336; 340/324 M; 340/378 MW
[51] Int. Cl.² .......................................... G09F 9/32
[58] Field of Search... 340/336, 373, 324 R, 324 M, 340/378 MW

[56] References Cited
UNITED STATES PATENTS

| | | | |
|---|---|---|---|
| 3,307,170 | 2/1967 | Aorama et al. | 340/324 R |
| 3,444,551 | 5/1969 | Winrow | 340/336 |
| 3,469,258 | 9/1969 | Winrow | 340/336 |
| 3,482,344 | 12/1969 | Holloman | 340/373 |

*Primary Examiner*—Marshall M. Curtis
*Attorney, Agent, or Firm*—Richards, Harris & Medlock

[57] ABSTRACT

A matrix display device comprises an array of display elements each including two display members mounted for rotation about spaced, parallel axes. The two display members comprising a particular display element are magnetically actuated, and operate simultaneously to position a selected one of at least two display surfaces in a display orientation. The display members are received in a transparent plastic housing apparatus which also receives a transparent liquid that functions to rotatably support and lubricate the display members. The refractive characteristics of the transparent liquid serve to render the border between adjacent display members substantially visually indistinguishable, and the housing apparatus may be specially designed to further diminish the observability of the border, whereby the two display members comprising a particular display element appear to comprise a single display member. The liquid also serves to eliminate internal reflections and light scattering by surface irregularities of the housing apparatus. In an alternative embodiment of the invention the display members comprise transparent plastic members each having one opaque display surface, and light is directed through stacked display members to provide an illuminated matrix display device. In another alternative embodiment the display members are triangular in cross-section and have three visually distinguishable display surfaces. Two such display members comprise each display element of the array, and magnetic apparatus is provided for positioning selected display surfaces of the two display members comprising a particular element in a display orientation.

18 Claims, 14 Drawing Figures

DISPLAY DEVICE HAVING AN ARRAY OF MOVABLE DISPLAY ELEMENTS

BACKGROUND AND SUMMARY OF THE INVENTION

This invention relates to matrix display devices, and more particularly to matrix display devices in which display members are magnetically positioned.

Heretofore a wide variety of matrix display devices have been designed. Such devices typically comprise an array of display members which take the form of cylinders, disks, or other shapes, but each characterized by two visually distinguishable display surfaces. The display members are individually positioned with a selected display surface in a display orientation to form alphanumeric characters or symbols. Various types of display member positioning apparatus are also known in the art, including magnetic apparatus, pneumatic apparatus, fluidic apparatus, etc.

The present invention comprises an improvement in the art of matrix display devices. In accordance with the broader aspects of the invention, each display element of a matrix display device comprises a pair of display members which are operated simultaneously to position one of at least two display surfaces in a display orientation. By this means the physical size of the matrix display device is substantially reduced and the speed and reliability of operation of the device are simultaneously increased. The display members comprising each display element are mounted for rotational movement about parallel axes and have permanent magnets mounted therein. A common electromagnetic apparatus is utilized to simultaneously operate the two display members comprising each display element.

In accordance with more specific aspects of the invention, the permanent magnets of the two display members comprising a particular display element are located at spaced apart points along the axes of rotation of the display members. The electromagnetic apparatus includes a coil and a common yoke extending to poles positioned in alignment with the permanent magnets of the display members.

In accordance with other aspects of the invention, the display members are received in a transparent housing structure. A transparent liquid fills the housing structure and surrounds the display members therein. The transparent liquid rotatably supports the housing members, whereby no axles, bearings or other external support structure is necessary to the proper functioning of the matrix display device. Moreover, the refractive characteristics of the liquid tend to diminish the border between adjacent display members, and causes adjacent display members to appear to comprise a unitary display element.

The housing apparatus may comprise cylinders surrounding the display surfaces of the display members. The abutting edges of the cylinders may be formed so as to further diminish the border between the adjacent display members. Alternatively, the housing apparatus may comprise spaced apart sheets defining chambers for receiving the display members and filled with the transparent liquid.

Considered vertically, the housing apparatus may be divided into a series of cells, each having one of the display members rotatably supported therein. Alternatively, the display members may be stacked in a vertical column. In the latter case the display members are preferably provided with bearing surfaces whereby each display member rotatably supports the next adjacent display member.

In accordance with another embodiment of the invention, the vertically stacked display members may be transparent, and one display surface of each display member is opaque. In such instances light may be directed through the vertical column of the display members to provide an illuminated matrix display device.

In accordance with still another embodiment of the invention, each display member is triangular in cross-section and includes three visually distinguishable display surfaces. Magnetic apparatus is provided for selectively positioning one of the display surfaces in a display orientation. Such magnetic apparatus may comprise axially spaced permanent magnets mounted in the corners of the display members and axially spaced electromagnets positioned for cooperation with the permanent magnets to position the display members.

DESCRIPTION OF THE DRAWINGS

A more complete understanding of the invention may be had by reference to the following Detailed Description when taken in conjunction with the accompanying Drawings, wherein.

DETAILED DESCRIPTION

Figure 1:
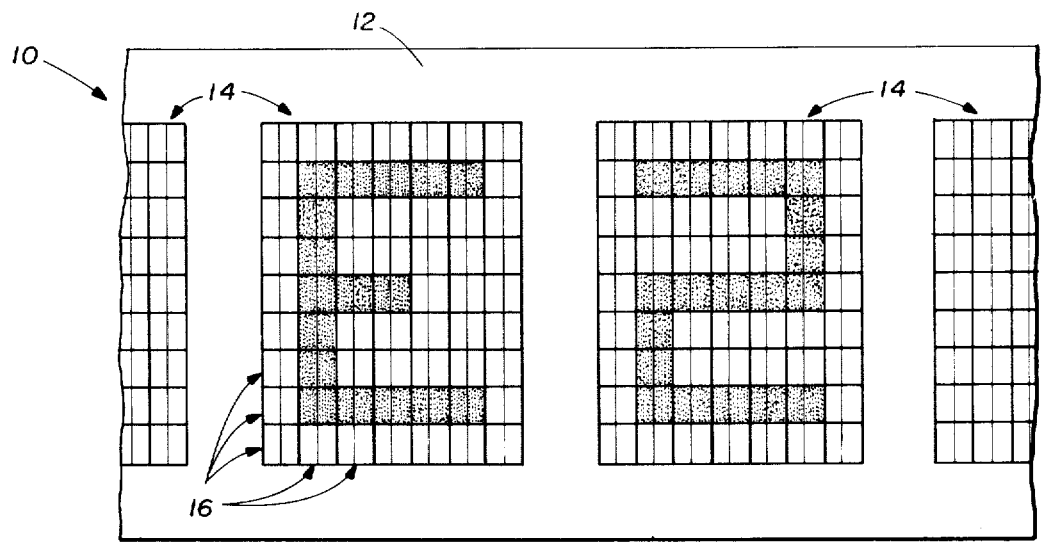
FIG. 1 is a front view of a matrix display device incorporating the invention.

Referring now to the Drawings, and particularly to FIG. 1 thereof, there is shown a matrix display device 10 incorporating the invention. The matrix display device 10 includes a frame 12 and a plurality of arrays of display elements 14 mounted in the frame 12. In FIG. 1 the matrix display device 10 is illustrated as comprising a horizontal line of arrays 14, however, it will be understood that the device 10 may comprise arrays 14 extending vertically and/or vertically and horizontally, in accordance with particular requirements.

Each array 14 comprises a plurality of display elements 16. In the operation of the matrix display device 10, the display elements 16 are selectively actuated to position one of at least two display surfaces in a display orientation, thereby forming alphanumeric characters or symbols. In the matrix display device 10 illustrated in FIG. 1, each array 14 comprises a 7 × 9 array of display elements 16. However, as will be understood by those skilled in the art, each array 14 may comprise a 5 × 7 array or any other array which may suit the requirements of particular circumstances.

Figure 2:
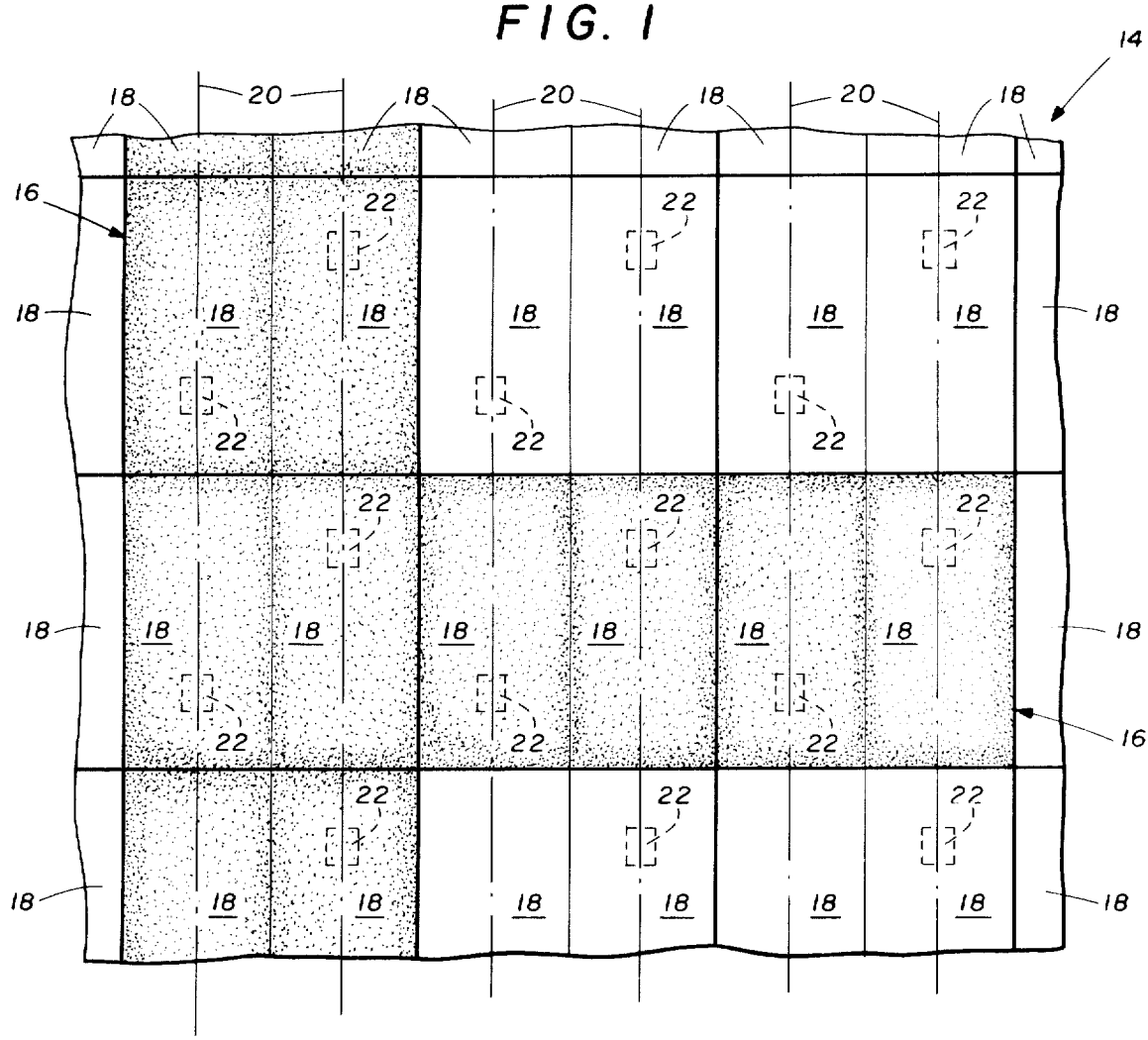
FIG. 2 is an enlargement of a portion of FIG. 1.

The display elements 16 and the arrays 14 of the matrix display device 10 are illustrated in greater detail in FIG. 2. The display elements 16 include display members 18 which comprise cylinders mounted for rotation about spaced, parallel axes 20. Each display element 16 comprises two display members 18 which are operated in unison to position one of at least two visually distinguishable display surfaces in a display orientation. The display members 18 each have a permanent magnet 22 mounted therein. The magnets 22 of adjacent display members 18 are positioned at axially spaced points relative to the axes of rotation 20 of the display members 18. This provides maximum separation between adjacent magnets 22, and thereby minimizes flux flow therebetween.

Figure 3:
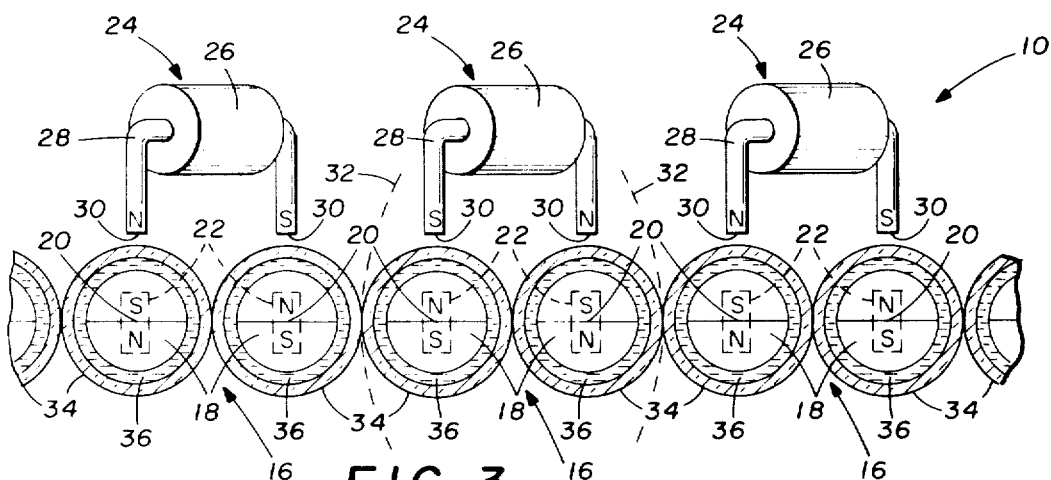
FIG. 3 is an enlarged top view of the matrix display device of FIG. 1.
Figure 4:
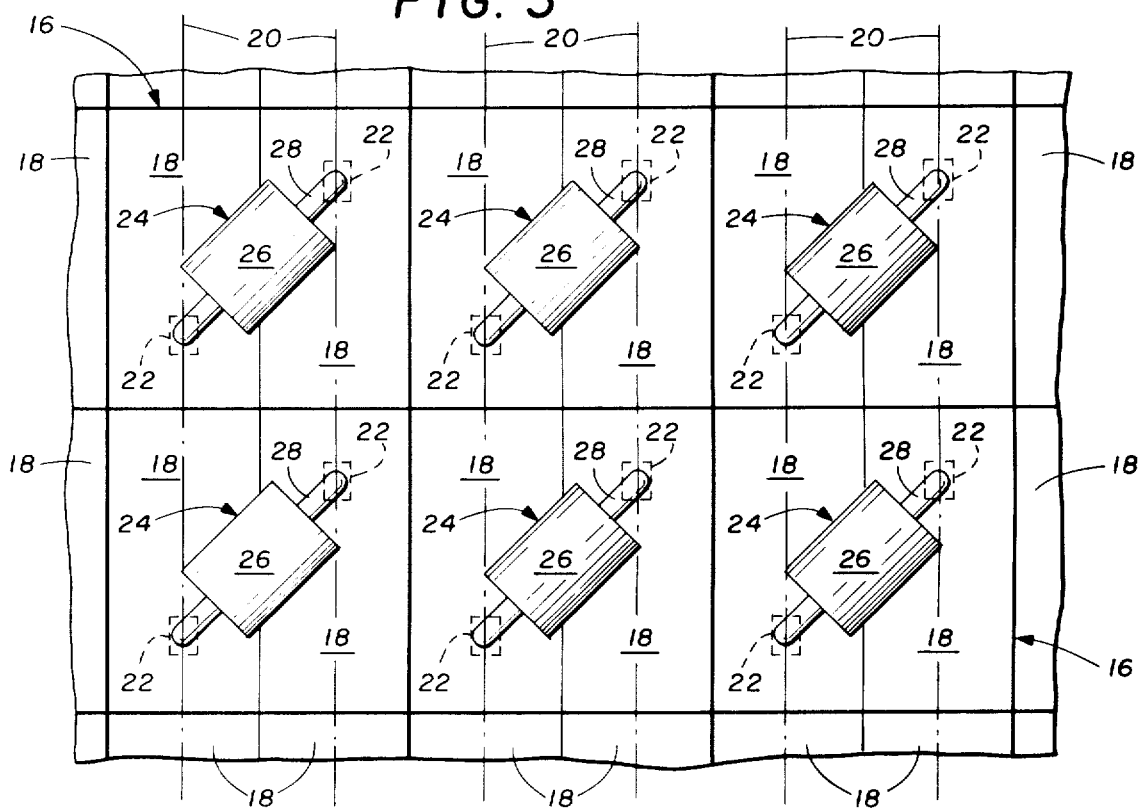
FIG. 4 is a rear view.

Referring to FIGS. 3 and 4, the display members 18 comprising each display element 16 are selectively positioned by an electromagnetic apparatus 24 individual to the display elements 16. Each electromagnetic apparatus 24 includes a coil 26 and a yoke 28 extending to poles 30 positioned in alignment with the permanent magnets 22 of the display members 18 comprising the display elements 16. Thus, upon current flow through the coil 26 in one direction, the display members 18 are rotated about the axes 20 to position a first display surface in the display orientation, and upon current flow to the coil 26 in the opposite direction, the display members 18 are rotated to position the opposite display surface in the display orientation. Referring particularly to FIG. 4, the yokes 28 of the electromagnetic assemblies 24 extend angularly so that the poles 30 are precisely aligned with the magnets 22 of the display members 18. The display members 18 are held in the last selected position by the attraction of the permanent magnet 22 to poles 30. Current flow is required only when the position of the display members is being altered.

In the embodiments of the invention illustrated in FIGS. 1-12, each display member 18 comprises two display surfaces each of which extends through an arc of 180° around one side of the display member 18. The display surfaces are separated by a diameter bisecting the permanent magnet 22 and extending perpendicular with respect thereto. Such display surfaces may be provided either by coating the exterior of at least half of the surface of the display member 18, or by forming the two halves of the display member 18 from different colored plastic materials. As is clearly shown in FIG. 3, the orientation of the display surfaces with respect to the polarity of the permanent magnets 22 is opposite for adjacent display members 18. This is because the polarity of the two poles 30 of each electromagnetic assembly 24 is necessarily opposite when the coil 26 is energized.

Referring again to FIG. 3, the dashed line 32 illustrates the approximate dimensions of a single cylindrical display member of the type utilized in the prior art. In accordance with the present invention, such a single cylindrical display member is replaced by the two display members 18 comprising each display element 16.

As will be apparent, the physical connections of the matrix display device 10 are thus substantially reduced, particularly in the direction extending mutually perpendicularly to the axes 20 and the line of display members 18. Another advantage deriving from the present invention involves the fact that a single large diameter cylindrical display member such as represented by the dashed line 32 has substantially greater rotational inertia than the display members 18 of the present invention. Matrix display devices incorporating the invention are therefore faster and more reliable in operation than are prior art devices.

In the embodiment of the invention illustrated in FIG. 3, each display member is received in a cylindrical, transparent plastic housing 34. The housing 34 in turn receives a transparent liquid 36 which surrounds the display member 18. Although various transparent liquids may be utilized in the practice of the invention, the use of ethylene glycol is preferred. Such liquid does not freeze even at extremely reduced temperatures, whereby the matrix display device 10 is adapted for use at low temperatures and under other adverse conditions.

The presence of the liquid 36 within the housing 34 serves to lubricate the display members 18, whereby the display members 18 rotate freely under the action of the electromagnetic assembly 24. At the same time, the liquid 36 exerts a damping effect which tends to reduce overtravel of the display members 18 and also prevents vibration thereof. It has been found that by means of the liquid 36, the need for external rotational supports for the display members 18, such as axles, bearings, and the like can be completely eliminated. By this means the cost of manufacturing the matrix display device 10 is substantially reduced.

Figure 5:
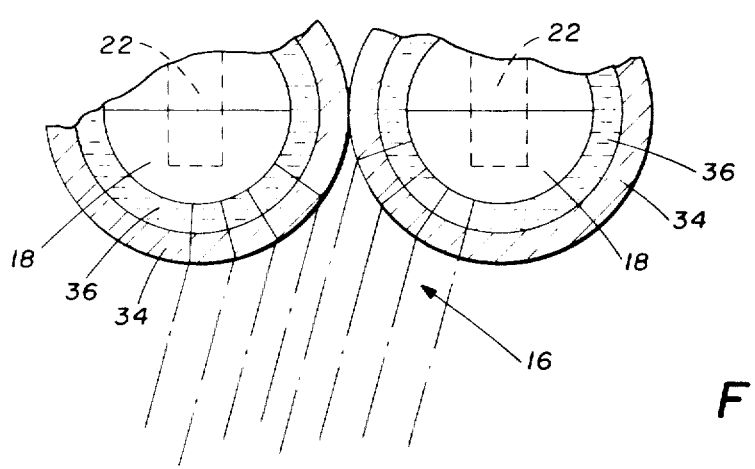
FIG. 5 is an illustration of the visual effect of the device.

Another advantage deriving from the use of the invention is illustrated in FIG. 5. Both the liquid 36 and the transparent plastic housing 34 tend to be highly refractive relative to light reflected from the display members 18. This factor tends to bend the light as shown, which in turn produces the highly desirable result of tending to visually obscure the border between adjacent display members 18. Thus, to the casual observer, the two display elements 18 comprising a particular display element 16 appear as a single display member such as those utilized in the prior art. In addition, the liquid serves to eliminate internal reflections and light scattering caused by surface irregularities of the housing 34.

Figure 6:
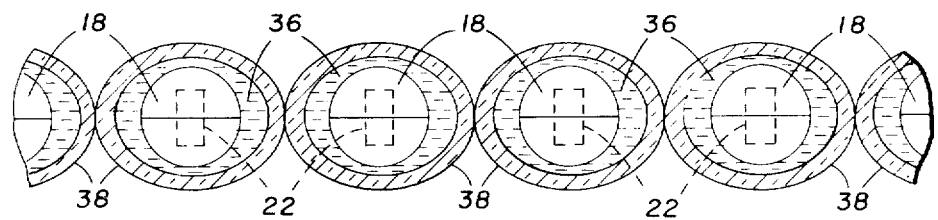
FIG. 6 is an illustration of an alternative housing arrangement which may be utilized in the practice of the invention.
Figure 7:
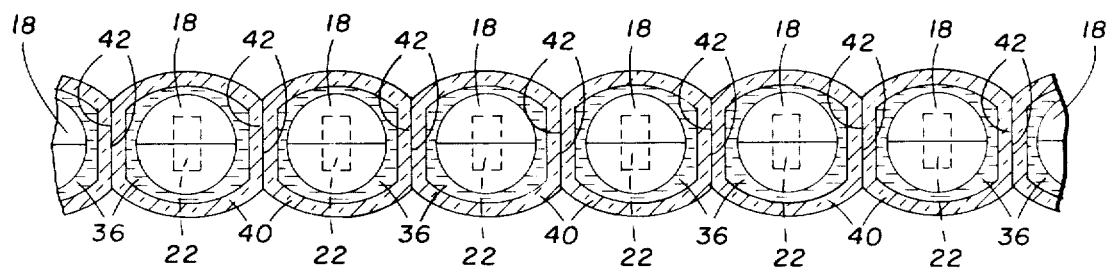
FIG. 7 is an illustration of another housing arrangement.
Figure 8:
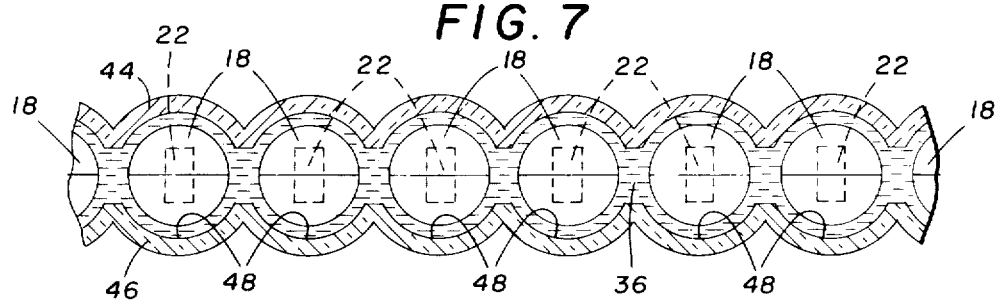
FIG. 8 is an illustration of still another housing arrangement.

FIGS. 6, 7 and 8 illustrate various means for enhancing this visual effect. In FIG. 6, the display members 18 of the display elements 16 are received in transparent plastic housing members 38 which are oval in shape. The liquid 36 is received in the housing members 38 and surrounds the display members 18. The oval shape of the housing members 38 tends to further visually obscure the borders between adjacent display members 18, whereby the two display members 18 comprising a particular display element 16 appears to comprise a single display element. This visual effect is further enhanced by means of the embodiment of the invention shown in FIG. 7, whereby the display members 18 are received in transparent plastic housing members 40 having flattened ends 42. Again, the liquid 36 is received in the housing members 40 and surrounds the display members 18. By means of the flattened ends 42, display members 18 are positioned much more closely together than is possible in the embodiment of the invention illustrated in FIG. 6. Also, the shape of the housing members 40 and the presence of the liquid 36 therein tends to obscure the borders between adjacent display members 18 whereby the two display members 18 comprising a particular display element 16 appear to comprise a single display element.

In FIG. 8, there is shown a housing apparatus comprising spaced apart plates 44 and 46. The plates 44 and 46 are formed to provide cavities or chambers 48 each of which receives one of the display members 18. The transparent liquid 36 extends continuously between all of the cavities 48 defined by the spaced apart plates 44 and 46.

Figure 9:
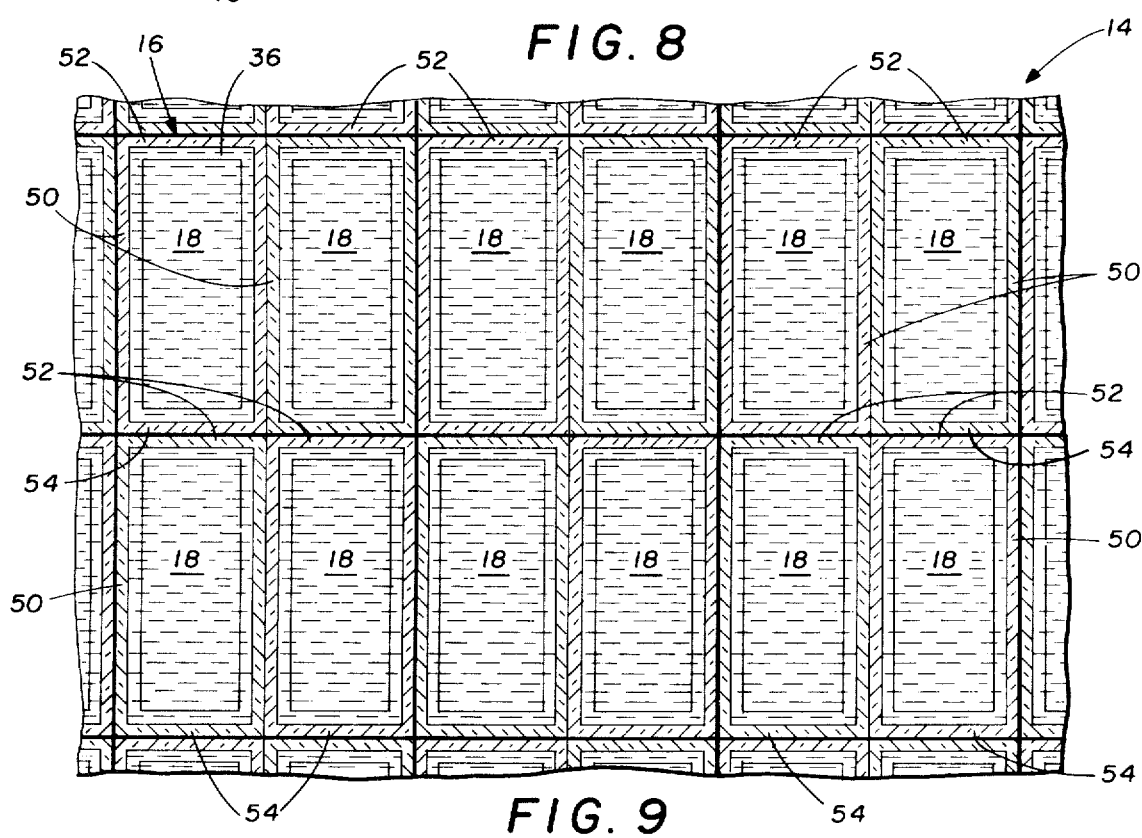
FIG. 9 is a vertical sectional view illustrating certain aspects of the housing of the matrix display device.

In FIG. 9, there is shown a vertical section through a typical array 14 incorporating the invention. Each display element 16 may be received in a cylindrical chamber 50 which may be formed as shown in FIGS. 3, 6, 7 or 8 in accordance with particular requirements. The cylindrical chambers 50 may have top and bottom walls 52 and 54, whereby each display member 18 is completely enclosed, and is rotatably supported by the fluid 36 which surrounds the display member 18. The arrangement illustrated in FIG. 9 is advantageous in constructing arrays 14 in accordance with the invention. Thus, an array of 5 × 7 display elements, 7 × 9 display elements, or any other desired arrangement may be formed by simply assembling the proper number of display elements 18 and the chambers 50 in which they are enclosed.

Figure 10:
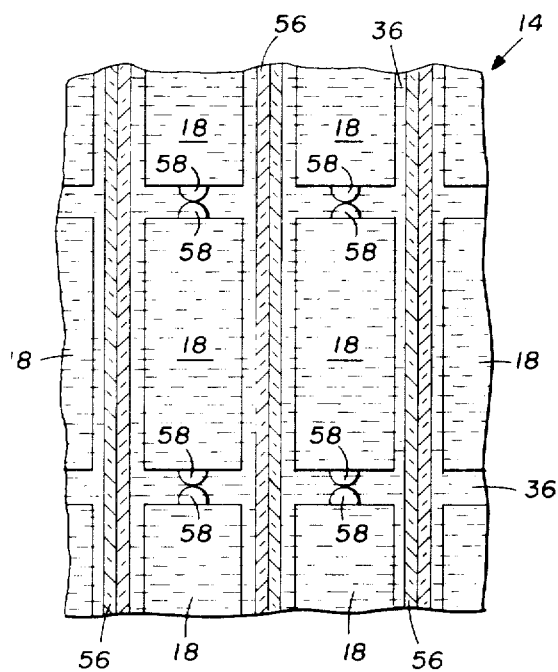
FIG. 10 is a view similar to FIG. 9 illustrating another housing arrangement.

Referring to FIG. 10, there is shown an alternative vertical section of the array 14. The display members 18 may be received in elongate cylindrical chambers 56 with the transparent liquid 36 surrounding all of the display members 18 in each chamber 56. In such instances the display members 18 are preferably provided with nibs 58 projecting from each end thereof and engaging corresponding nibs 58 on adjacent display members 18. By this means each display member 18 is rotatably supported on the next adjacent display member.

Figure 11:
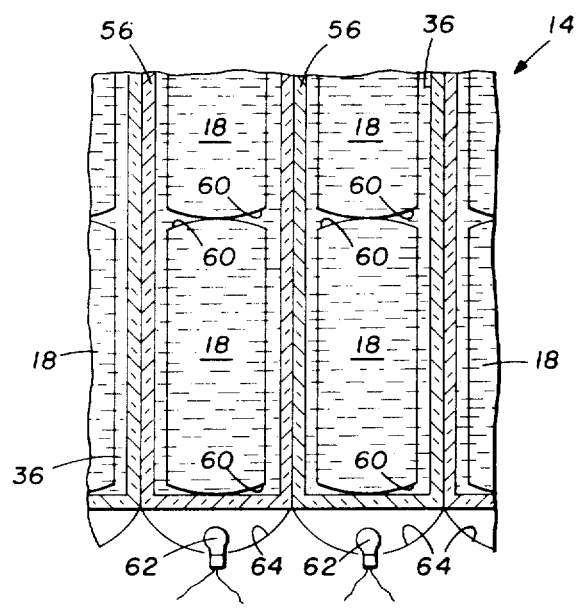
FIG. 11 is a view similar to FIG. 9 illustrating still another housing arrangement and further illustrating an alternative embodiment of the matrix display device.

As is clearly shown in FIG. 11, the display members 18 within the cylindrical chambers 56 may also be provided with spherical ends 60, whereby each display member 18 is rotatably supported by the next adjacent display member, and/or the end of the chamber 56. FIG. 11 further illustrates an alternative embodiment of the invention wherein light sources 62 and reflectors 64 are mounted at the ends of each cylindrical chamber 56.

Figure 12:
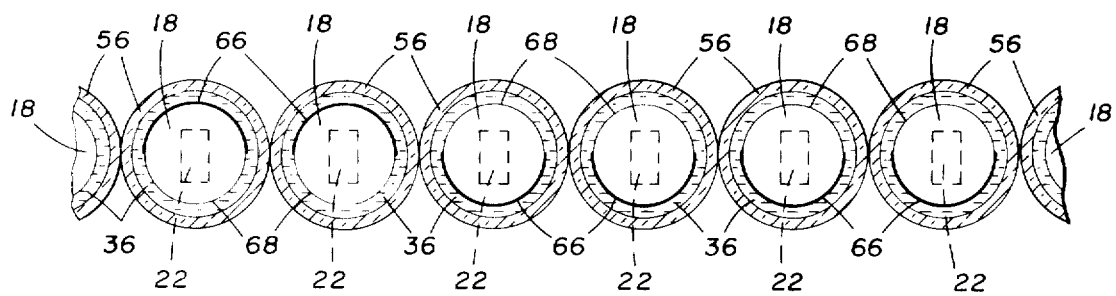
FIG. 12 is a further illustration of the alternative embodiment.

Referring to FIG. 12, the display members 18 of the alternative embodiment of the invention comprise transparent plastic members. One of the display surfaces of each display member 18 is provided with an opaque coating 66 while the opposite display surface 68 remains transparent. Thus, assuming the light sources 62 are actuated, the display members 18 either transmit light outwardly through the display surface 68 or block the passage of light by means of the opaque coating 66, depending on which of the display surfaces is in the display orientation.

Figure 13:
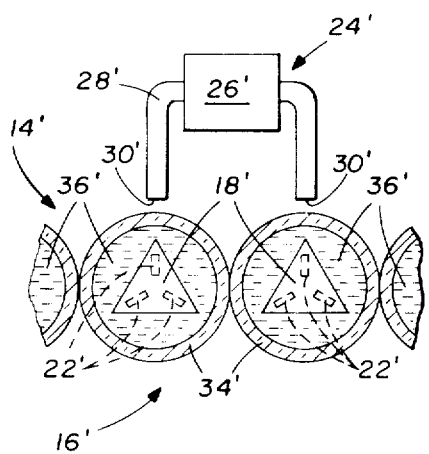
FIG. 13 is a top view illustrating another alternative embodiment of the invention.
Figure 14:
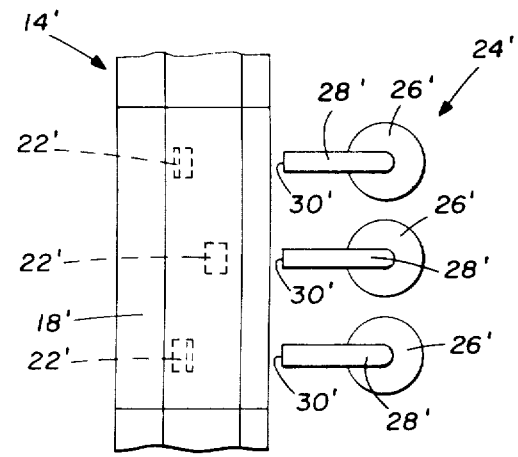
FIG. 14 is a side view further illustrating the embodiment of FIG. 13.

Yet another alternative embodiment of the invention is illustrated in FIGS. 13 and 14. An array 14' comprises a plurality of display elements 16' each including two display members 18'. The display members 18' are received in transparent cylindrical housings 34' which also receive the transparent liquid 36'. The transparent liquid 36' serves to rotatably support and lubricate the display members 18', whereby the display members 18' are supported for rotation about spaced, parallel axes.

The display members 18' are each triangular in cross-section and each comprise three visually distinguishable display surfaces. Three permanent magnets 22' are mounted in each display member 18'. The magnets 22' are mounted in the three corners of each display member 18', and is clearly shown in FIG. 14, the magnets 22' of each display member 18' are axially spaced apart. FIG. 14 further illustrates an electromagnetic apparatus 24' which may be utilized to selectively position the two display members 18' of a particular display element 16' with a selected display surface in a display orientation. The electromagnetic apparatus 24' comprises three coils 26' and three yokes 28' each extending to poles 30'. The poles 30' are positioned in vertical alignment with the positioning of the permanent magnets 22'.

Whenever it is desired to position the display members 18' of a particular display element with a selected display surface in the display orientation, the coil 26' corresponding to the permanent magnet 22' of the display members 18' which in turn corresponds to the selected display surfaces is energized to attract the particular permanent magnets 22'. The coils 26' of the two remaining components of the permanent magnet assembly 24' may also be actuated to repel their respective permanent magnets 22', if desired.

From the foregoing, it will be understood that the present invention comprises a matrix display device incorporating numerous advantages over the prior art. One of the most important advantages deriving from the invention involves the fact that in accordance therewith each display element of a matrix display device comprises two display members which are operated simultaneously to position one of at least two visually distinguishable display surfaces in a display orientation. Another important advantage deriving from the use of the invention involves the fact that in accordance therewith, display members are received in transparent housings which also receive a transparent liquid that functions to rotatably support and lubricate the display members, thereby eliminating the need for axles, bearings, or other external support apparatus. Other advantages deriving from the use of the invention will readily suggest themselves to those skilled in the art.

Although preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

What is claimed is:

1. In a matrix display device of the type in which a plurality of display elements are individually positioned in a selected one of two display orientations to form alphanumeric characters or symbols, wherein the improvement comprises:

each of said display elements including two display members mounted for rotation about spaced, parallel axes;

each of said display members having magnet means which are oppositely poled with respect to corresponding display surfaces of said display members; and electromagnetic means having pole pieces positioned to cooperate with said magnet means, whereby corresponding display surfaces of each display member of each display element are simultaneously positioned in a display orientation.

2. The improvement according to claim 1 further characterized by:
said magnet means comprising permanent magnetic means mounted in each of the display members;
the permanent magnet means of one display member being positioned at a point on the axis of rotation thereof which is substantially displaced from the positioning of the permanent magnet means of the other display member on the axis of rotation thereof to substantially prevent flux flow therebetween; and
wherein the positioning means comprises an electromagnet including a yoke extending to poles positioned in alignment with the positioning of the permanent magnet means in the display members.

3. The improvement according to claim 1 further characterized by:
transparent housing means substantially surrounding each display member; and
a transparent liquid contained within the housing means and surrounding the display member.

4. The improvement according to claim 3 wherein the housing means and the liquid comprise means for causing the two display members comprising each display element to appear to be a single display member.

5. The improvement according to claim 1 wherein the display members are arranged in vertical columns, the further including bearing means for rotatably supporting each display member on the next adjacent display member.

6. The improvement according to claim 1 wherein the display members are transparent, wherein at least a portion of the exterior surface of each display member is opaque, and further including means for directing light upwardly through columns of display members.

7. The improvement according to claim 1 further characterized by:
each display member being triangular in cross-section and having three visually distinct display surfaces;
magnetic means mounted in each corner of each display member at axially spaced points; and
magnetic means positioned for cooperation with the magnetic means in each display member to selectively position any one of the three display surfaces thereof in a predetermined display orientation.

8. A matrix display device comprising:
means defining an array of display elements each selectively positionable in one of two display orientations to form a predetermined alphanumeric character or symbol;
each of said display elements including a pair of display members having at least two visually distinguishable display surfaces and mounted for rotation about a predetermined axis;
transparent housing means for receiving the display member;
a transparent liquid contained in the housing means and surrounding the display member;
permanent magnet means mounted within each display member and oppositely poled with respect to corresponding display surfaces; and
electromagnetic means having pole pieces located outside of the housing means for cooperation with the permanent magnet means of the display member, whereby corresponding display surfaces of each display member are simultaneously positioned in a predetermined display orientation.

9. The matrix display device according to claim 8 and further comprising:
the permanent magnet means of the two display members comprising a particular display element being positioned at axially spaced points along the axes of rotation of the display members to substantially prevent flux flow therebetween, the electromagnetic means comprising yoke extending to poles positioned in alignment with the permanent magnet means of the display members.

10. The matrix display device according to claim 8 wherein the housing means extends entirely around the display surfaces of each display member, and wherein the housing means further comprises means for rendering adjacent display members substantially visually indistinguishable one from the other.

11. The matrix display device according to claim 8 wherein the housing means comprises a pair of spaced apart plates defining a plurality of chambers each for receiving one of the display members.

12. The matrix display device according to claim 8 wherein the display members are arranged in vertical columns and wherein each display member comprises bearing means for rotatably supporting the next adjacent display member.

13. The matrix display device according to claim 8 wherein the display members comprise transparent members, wherein at least one of the display surfaces of each display member is opaque, and further including means for directing light through vertical columns of display members.

14. The matrix display device according to claim 8 wherein each display member is triangular in cross-section and defines three visually distinguishable display surfaces, and wherein the electromagnetic means functions to selectively position a predetermined one of the display surfaces of each display member in the display orientation.

15. A matrix display device comprising:
a plurality of pairs of display members each triangular in cross-section and each having three visually distinguishable display surfaces;
each of said pairs of display members being mounted for rotation about spaced parallel axes;
three permanent magnet means mounted within each said display member such that said magnet means are oppositely poled with respect to corresponding display surfaces; and
electromagnetic means having pole pieces positioned for cooperation with individual ones of the permanent magnet means within the display members, whereby corresponding display surfaces of each pair of display members are simultaneously positioned in a display orientation.

16. The matrix display device according to claim 15 further characterized by:
the permanent magnet means of each display member being mounted in the corners thereof and at axially spaced points; and
the electromagnetic means including poles mounted at axially spaced points in alignment with the permanent magnet means of the display members.

17. The matrix display device according to claim 15 further characterized by:

the display members being arranged in pairs with each pair of display members comprising a display element;

each electromagnetic means being common to the two display members comprising a display element and function to simultaneously position both display members with the same display surfaces thereof in the display orientation.

18. The matrix display device according to claim 17 further characterized by:

transparent housing means surrounding each of the display members; and a transparent liquid contained within the housing means and surrounding the display member therein.

* * * * *